(12) United States Patent
Xian et al.

(10) Patent No.: US 12,183,250 B2
(45) Date of Patent: Dec. 31, 2024

(54) DISPLAY CONTROL METHOD AND ELECTRONIC DEVICE

(71) Applicant: Lenovo (Beijing) Limited, Beijing (CN)

(72) Inventors: Dayang Xian, Beijing (CN); Sujie Ding, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 220 days.

(21) Appl. No.: 17/550,720

(22) Filed: Dec. 14, 2021

(65) Prior Publication Data
US 2022/0319388 A1    Oct. 6, 2022

(30) Foreign Application Priority Data
Mar. 30, 2021    (CN) .......................... 202110341326.0

(51) Int. Cl.
G06T 7/20    (2017.01)
G09G 3/20    (2006.01)

(52) U.S. Cl.
CPC ............. *G09G 3/2092* (2013.01); *G06T 7/20* (2013.01); *G09G 2340/0407* (2013.01); *G09G 2340/0464* (2013.01); *G09G 2354/00* (2013.01); *G09G 2370/20* (2013.01)

(58) Field of Classification Search
None
See application file for complete search history.

(56) References Cited

U.S. PATENT DOCUMENTS

| | | | | |
|---|---|---|---|---|
| 2005/0068254 A1* | 3/2005 | Booth | ................ | H04W 52/027 345/3.3 |
| 2011/0096081 A1* | 4/2011 | Smith | ................ | G06F 9/451 345/522 |
| 2012/0133589 A1* | 5/2012 | Marsden | ............... | G06F 3/0202 345/168 |
| 2014/0210860 A1* | 7/2014 | Caissy | ................ | G06F 3/0338 345/659 |
| 2016/0188274 A1* | 6/2016 | Chen | ................ | G09G 5/14 345/2.1 |
| 2021/0084136 A1* | 3/2021 | Zhao | ................ | H04L 67/06 |
| 2021/0373837 A1* | 12/2021 | Sun | ................ | G06F 3/0488 |

FOREIGN PATENT DOCUMENTS

CN    107851416 A    3/2018

* cited by examiner

*Primary Examiner* — Yi Wang
(74) *Attorney, Agent, or Firm* — ANOVA LAW GROUP, PLLC

(57) ABSTRACT

Display control method and electronic device are provided. The display control method is applied to the electronic device including a first processor, a second processor, and a display controller. The method includes: determining first information based on first data and sending the first information to the display controller when the first processor obtains the first data; dividing by the display controller a display area of the display device into a first display area and a second display area in response to the first information; receiving the first data sent by the first processor and controlling the first data to be displayed in the first display area by the display controller; and obtaining second data sent by the second processor and controlling the second data to be displayed in the second display area by the display controller.

20 Claims, 6 Drawing Sheets

DISPLAY CONTROL METHOD AND ELECTRONIC DEVICE

CROSS-REFERENCE TO RELATED APPLICATION

This application claims priority of Chinese Patent Application No. 202110341326.0, filed on Mar. 30, 2021, the entire contents of which are hereby incorporated by reference.

FIELD OF THE DISCLOSURE

The present disclosure generally relates to the field of information technology and, more particularly, relates to a display control method and an electronic device.

BACKGROUND

When data is displayed on a display screen, a single processor such as a central processing unit (CPU) is often used in an electronic device to create different windows and render the data in the windows. However, a flexibility of the way to render data via a single processor is insufficient.

BRIEF SUMMARY OF THE DISCLOSURE

One aspect of the present disclosure provides a display control method. The display control method is applied to an electronic device including a first processor, a second processor, a display controller and a display device. The method includes: determining first information based on first data and sending the first information to the display controller when the first processor obtains the first data; dividing by the display controller a display area of the display device into a first display area and a second display area in response to the first information; receiving the first data sent by the first processor and controlling the first data to be displayed in the first display area by the display controller; and obtaining second data sent by the second processor and controlling the second data to be displayed in the second display area by the display controller. The second data is data displayed in the display area when the electronic device receives the first data.

Another aspect of the present disclosure provides an electronic device. The electronic device includes a first processor, a second processor, a display controller, and a display device. The first processor is configured to obtain first data. When the first data is obtained, the first processor determines first information based on the first data and sends the first information to the display controller. The display controller is configured to divide a display area of the display device into a first display area and a second display area in response to the first information. The display controller is further configured to receive the first data sent by the first processor and control the first data to be displayed in the first display area. The display controller is further configured to obtain second data sent by the second processor and control the second data to be displayed in the second display area. The second data is data displayed in the display area when the electronic device receives the first data.

Another aspect of the present disclosure provides a computer-readable storage medium storing a computer program. When the computer program is executed by a processor, a display control method can be implemented. The display control method is applied to an electronic device including a first processor, a second processor, and a display controller. The method includes: determining first information based on first data and sending the first information to the display controller when the first processor obtains the first data; dividing by the display controller a display area of the display device into a first display area and a second display area in response to the first information; receiving the first data sent by the first processor and controlling the first data to be displayed in the first display area by the display controller; and obtaining second data sent by the second processor and controlling the second data to be displayed in the second display area by the display controller. The second data is data displayed in the display area when the electronic device receives the first data.

Other aspects of the present disclosure can be understood by those skilled in the art in light of the description, the claims, and the drawings of the present disclosure.

DETAILED DESCRIPTION

The following will clearly and completely describe technical solutions in embodiments of the present disclosure with reference to accompanying drawings in the embodiments of the present disclosure.

The specific embodiments described herein are only configured to explain the present disclosure and are not configured to limit the present disclosure.

The present disclosure relates to the field of information technology and, more particularly, relates to a display control method and an electronic device.

When displaying data on a display screen, the electronic device usually creates different windows via a single processor such as a CPU of the electronic device and renders the data in the windows. However, a flexibility of rendering data via a single processor is insufficient to meet rendering and display requirements for different types of data.

Figure 1:
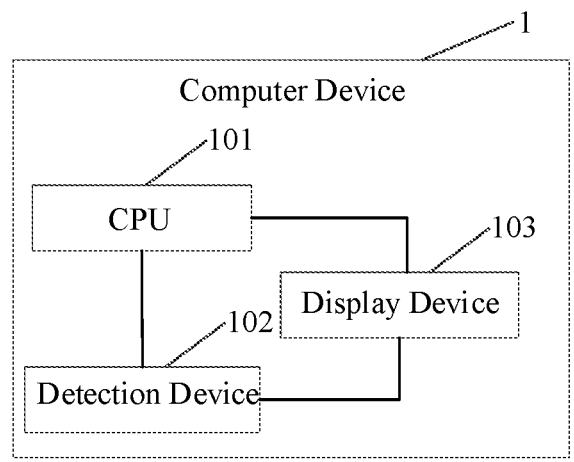
FIG. 1 illustrates a schematic diagram of a computer device processing data display via a CPU.

Taking an electronic device as a computer device as an example, FIG. 1 illustrates a schematic diagram of a computer device processing data display via a CPU. As shown in FIG. 1, a computer device 1 includes a CPU 101, a detection device 102, and a display device 103.

The detection device 102 is configured to detect an instruction sent to the computer device to create a new window and is also configured to obtain data displayed in the new window. The CPU101 is configured to control the display device 103 to respond to the above instruction and display the data when receiving the instruction or data sent by the detection device.

As can be seen from the above, when the CPU101 needs to display and load many windows, a load of CPU101 is too heavy. A CPU101's control and display process of data is based on an operating system (OS) of the computer device. The OS is not flexible enough for various data rendering methods.

Based on the above problems, the embodiments of the present disclosure provide a display control method. When obtaining first data, a first processor of the electronic device can determine first information based on the first data. In response to the first information, a display controller of the electronic device can divide a display area of the display device of the electronic device into a first display area and a second display area. The display controller can respectively receive the first data sent by the first processor and second data sent by a second processor and display the data in the first display area and the second display area respectively, thereby realizing a separate management of different areas of a display screen via different processors and improving a flexibility of data display.

Figure 2:
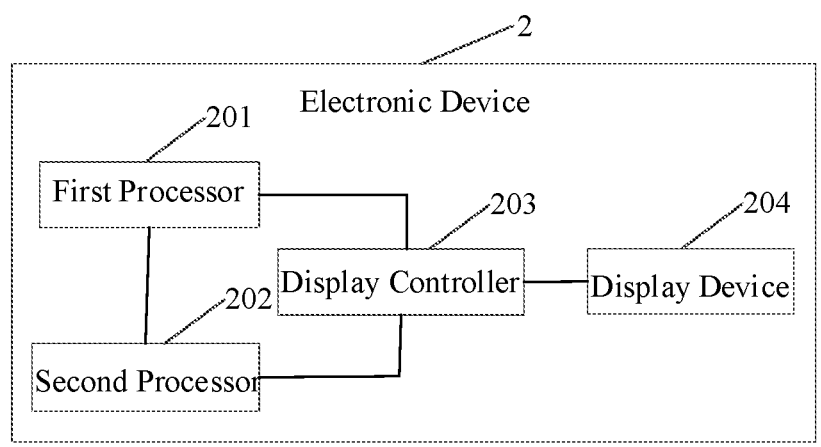
FIG. 2 illustrates a schematic diagram of an electronic device consistent with various embodiments of the present disclosure.

The display control method provided by the embodiments of the present disclosure is applied to an electronic device 2. FIG. 2 illustrates a schematic diagram of the electronic device 2 consistent with various embodiments of the present disclosure. As shown in FIG. 2, the electronic device 2 includes a first processor 201, a second processor 202, a display controller 203, and a display device 204.

In one embodiment, the electronic device 2 may be a computer device such as a notebook computer device.

In one embodiment, the first processor 201 may be a processor different from a CPU normally set in the electronic device 2. Accordingly, the second processor 202 may be a CPU.

In one embodiment, number of first processors 201 may be a plurality.

Accordingly, number of second processors 202 may also be a plurality. When the second processor is a CPU, the second processor may be a multi-core CPU.

In one embodiment, the first processor 201 may be a processor with certain control capabilities and data computing capabilities. Exemplarily, functions of the first processor 201 may be complementary to functions of the second processor 202. For example, the second processor 202 is configured to control a boot and a start of the electronic device and can also be configured to execute various instructions generated by an OS of the electronic device 2. The first processor 201 can be configured to enhance functions of the OS. For example, the second processor 202 can be configured to implement pattern recognition, intelligent control, etc.

In one embodiment, the first processor 201 may be an artificial intelligence chip (AI Chip) provided in the electronic device 2.

In one embodiment, the first processor 201 and the second processor 202 may be connected via a communication bus. Exemplarily, the communication bus may be a standard communication bus in the electronic device 2, such as a serial peripheral interface (SPI), a universal serial bus (USB), etc.

In one embodiment, the display controller 203 may be implemented based on hardware. Exemplarily, the display controller may be Scalar.

In one embodiment, the display controller 203 and the first processor 201 may also be connected via a standard communication bus, such as a mobile industry processor interface (MIPI). Accordingly, the display controller 203 and the second processor 202 may also be connected via a standard communication bus, such as an embedded display port (eDP).

In one embodiment, the display device 204 may be a display device of the electronic device 2. Exemplarily, the display device may be a liquid crystal display (LCD).

In one embodiment, the display device 204 and the display controller 203 may be connected via a standard communication bus such as an eDP.

Figure 3:
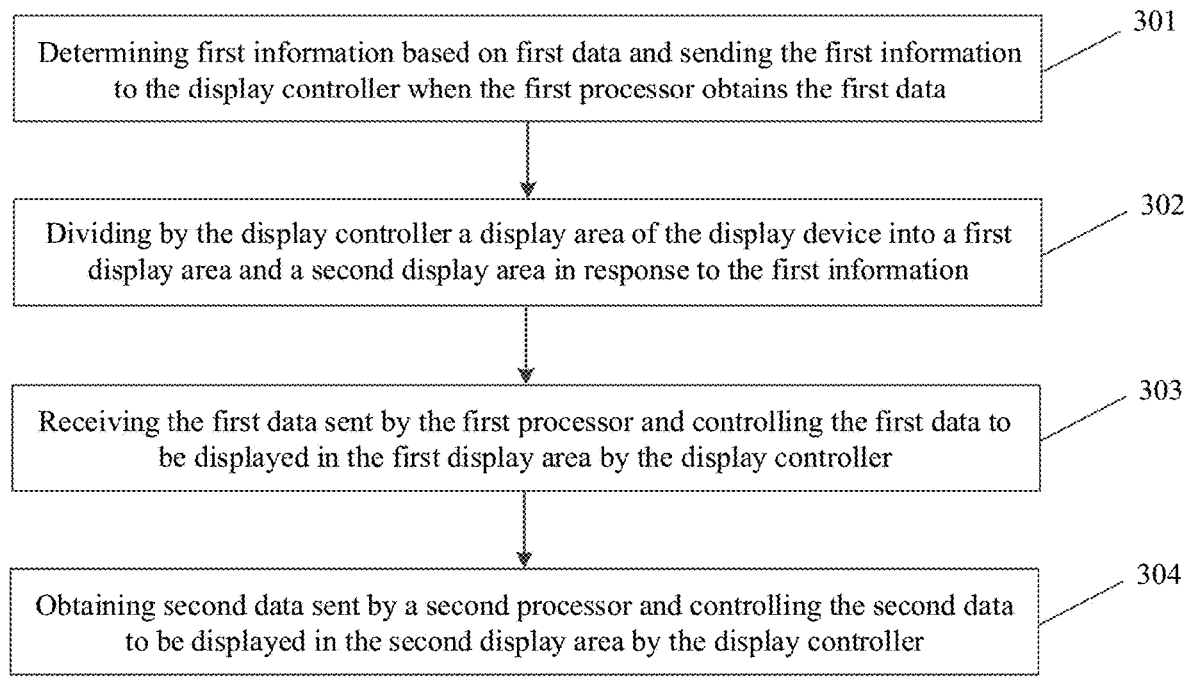
FIG. 3 illustrates a flow chart of a display control method consistent with various embodiments of the present disclosure.

FIG. 3 illustrates a flow chart of a display control method consistent with various embodiments of the present disclosure. As shown in FIG. 3, the method may include steps S301-S304.

S301: determining first information based on first data and sending the first information to the display controller when the first processor obtains the first data.

In one embodiment, the first data may be data to be displayed. Exemplarily, the first data may be at least one of text data, picture data, video data, etc.

In one embodiment, the first data may be data sent by the electronic device to the first processor.

In one embodiment, to facilitate the first processor to obtain the first data in real time, the first processor may be connected to a real-time operating system (RTOS) of the electronic device.

In one embodiment, the determining the first information based on the first data can be achieved in any of following ways: analyzing a validity of the first data, and determining the first information if the first data is determined to be valid; analyzing a format of the first data, and determining the first information based on the first data if the format of the first data is a data format that can be rendered by the electronic device; analyzing the first data, determining time delay information, and determining the first information according to the delay information, wherein exemplarily the time delay information can be configured to control a display time of the first data and can also be configured to indicate the time threshold for the delay of the first data to be displayed; and analyzing an importance of the first data and determine the first information according to the importance, wherein exemplarily, if the importance is high, the first information can be determined to be a real-time display of the first data, if the importance is low, the first information can be determined to be a delayed display of the first data.

In one embodiment, the first information is configured to instruct the display controller to switch from a current working state to a working state for displaying the first data In one embodiment, sending by the first processor the first information to the display controller may be performed in real time.

In one embodiment, when number of the first information is a plurality, the plurality of first information pieces may be sent to the display controller in parallel, and the plurality of first information pieces may also be sent to the display controller in series.

S302: dividing by the display controller a display area of the display device into a first display area and a second display area in response to the first information.

In one embodiment, the first display area and the second display area may be display areas adjacent to each other. Exemplarily, the display area may only include a first display area and a second display area. A combination of the first display area and the second display area can cover the entire display area.

In one embodiment, the first display area and the second display area may be display areas that are not adjacent to each other.

In one embodiment, the display area may include a plurality of first display areas and a plurality of second display areas. Exemplarily, the plurality of first display areas may be independent of each other, or some or all of the plurality of first display areas may overlap together. Accordingly, the plurality of second display areas may be independent of each other, or some or all of the plurality of second display areas may overlap.

In one embodiment, after the display controller divides the first display area and the second display area, first coordinate information of the first display area and second coordinate information of the second display area can be obtained.

In one embodiment, after the display controller divides the display area into the first display area and the second display area, the display controller can also update an actual display area of the first display area and/or an actual display area of the second display area in real time as needed. Accordingly, the display controller can also update the first coordinate information and the second coordinate information in real time.

S303: receiving the first data sent by the first processor and controlling the first data to be displayed in the first display area by the display controller.

In one embodiment, after dividing the display area to obtain the first display area, the display controller may set a default display style for the first display area, and display the first data according to the default display style.

In one embodiment, a display mode of the first data in the first display area may be determined by the display controller according to the first information. Exemplarily, when display mode information is not carried in the first information, the display controller may display the first data in the first display area according to the default display style.

S304: obtaining second data sent by a second processor and controlling the second data to be displayed in the second display area by the display controller.

The second data is data displayed in the display area when the electronic device receives the first data.

In the embodiments of the present disclosure, a sequence between S303 and S304 can be adjusted successively, which is not limited herein.

In one embodiment, the second data may be data displayed in a window created by an application program in the display area. Exemplarily, the application program may be a system application program or a user application program of the electronic device.

In one embodiment, when no window is created in the display area, the second data may be a desktop displayed by the electronic device when the first data is received.

In one embodiment, since the display controller divides the display area into the first display area and the second display area, an area of the second display area is reduced.

Accordingly, an operation of displaying the second data in the second display area may be performed after the second data is accordingly reduced.

As can be seen from the above, in the display control method provided by the embodiments of the present disclosure, after the first data is obtained, the first processor of the electronic device can determine the first information based on the first data, so that the display controller of the electronic device can divide the display area into the first display area and the second display area. Therefore, the display area of the electronic device is uniformly managed by the display controller of the electronic device, thereby improving an efficiency of the display area control. The display controller can also receive the first data sent by the first processor and control the first data to be displayed in the first display area. At a same time, the display controller can receive the second data sent by the second processor and control the second data displayed in the second display area. Therefore, the display controller of the electronic device can receive control signals of at least two processors. Under a control of the at least two controllers, the display controller of the electronic device can respectively display the data that the two processors need to display in different display areas.

In summary, in the display control method provided by the embodiments of the present disclosure, the display controller of the electronic device can uniformly manage the display area of the electronic device, divide the display area into a first display area and a second display area according to the first information sent by the first processor, receive instructions and data to be displayed sent by a plurality of processors, and display data to be displayed sent by each processor in the first display area and the second display area respectively, thereby realizing a process of the plurality of processors controlling the data display rendering, and improving a flexibility of the electronic device data display.

In the embodiments of the present disclosure, the electronic device further includes an input device.

In one embodiment, the input device may be integrated in the electronic device or the input device may be a device that establishes a communication connection with the electronic device.

In one embodiment, the input device can send an interrupt request to the electronic device, and can also output at least one of character information, audio information, video information, and image information to the electronic device.

Accordingly, the display control method provided by the embodiments of the present application further includes steps A1 and A2.

A1: receiving by the first processor third data inputted by the input device when the coordinate information is in the first display area.

The coordinate information includes a location information of the input device mapped in the display area.

Accordingly, if the coordinate information is not in the first display area, the first processor may not receive the third data inputted by the input device. Exemplarily, the first processor may not be able to receive the third data.

In one embodiment, the coordinate information includes a coordinate value of an icon object in a graphical user interface (GUI) of the display area mapped by the input device via an OS of the electronic device.

In one embodiment, the coordinate information may be obtained by the first processor or the second processor and updated in real time.

In one embodiment, the display controller of the electronic device may receive coordinate information sent by the first processor or the second processor.

In one embodiment, the third data may include at least one of interrupt request data, character data, image data, video data, audio data, etc.

In one embodiment, when the coordinate information is in the first display area, the first processor of the electronic device can receive the third data inputted by the input device and send the third data to the display controller for the display controller to control the third data to be displayed in the first display area.

A2: receiving by the second processor fourth data inputted by the input device when the coordinate information is in the second display area.

Accordingly, when the coordinate information is not in the second display area, the second processor may not receive the fourth data inputted by the input device. Exemplarily, the second processor may not be able to receive the fourth data.

In the embodiments of the present disclosure, like the third data, the fourth data may also include at least one of interrupt request data, character data, image data, video data, audio data, etc.

In one embodiment, when the coordinate information is in the second display area, the second processor of the electronic device can receive the fourth data and send the fourth data to the display controller. Furthermore, the display controller may control the fourth data to be displayed in the second display area.

As can be seen from the above, in the display control method provided by the embodiments of the present disclosure, the display controller can not only receive the display data output by at least two processors, but also can obtain the coordinate information of the input device of the electronic device after the display data output by each processor is displayed. When the coordinate information is in different display areas, processors corresponding to the different display areas where the coordinate information is located receives the data inputted by the input device. In other words, the display control method provided by the embodiments of the present disclosure can not only display data separately in a plurality of display areas via a plurality of processors, but also can receive and respond to the data inputted by the input device in different display areas via different processors, so that each display area of the electronic device can realize a human-computer interaction function, and further improve a flexibility of data display.

In the embodiments of the present disclosure, the input device in steps A1 and A2 is an external control device.

In one embodiment, the external control device may be a mouse and/or keyboard device.

Accordingly, the display control method provided by the embodiments of the present application may further include step B.

B: analyzing a moving track of the coordinate information.

In one embodiment, the moving track of the coordinate information may be at least one of a historical moving track and a current moving track of the coordinate information.

In one embodiment, the moving track of the coordinate information may be a prediction result of the moving track of the coordinate information at a future time.

In one embodiment, the moving track of the coordinate information may include moving path information of the coordinate information. For example, the coordinate information moves in a first geometric shape in a first period and moves in a second geometric shape in a second period. Exemplarily, the first geometric shape may be an S shape; the second geometric shape may be a straight line.

In one embodiment, movement information of the coordinate track may be analyzed by the OS of the electronic device.

In one embodiment, the movement information of the coordinate track may be analyzed by the display controller.

After step B, step C, or step D can be further performed.

C: sending by the first processor second information to the second processor when a first condition is met.

The first condition indicates that the moving track is in the first display area and moves to the second display area. The second information includes an input operation of the external control device that the second processor needs to receive.

In one embodiment, the moving track is in the first display area, which may be determined by the display controller comparing the first coordinate information and coordinate information corresponding to the moving track.

In one embodiment, the moving track moves to the second display area, which may be determined by analyzing at least one of historical data and current data of the moving track.

In one embodiment, a judgement of the first condition may be determined by the first processor or the display controller.

In one embodiment, the second information can be sent in any form of pulse, character, etc.

In one embodiment, the second information may be agreed according to a communication protocol between the first processor and the second processor.

In one embodiment, after receiving the second information, the second processor can switch to a detection state of the coordinate information and/or track information. Exemplarily, after detecting the coordinate information and/or track information of the external control device, the second processor can receive data inputted by the external control device and display the data in the second display area.

D: sending by the second processor third information to the first processor when a second condition is met.

The second condition indicates that the coordinate information is in the second display area and moves to the first display area. The third information includes an input operation of the external control device that the first processor needs to receive.

In the embodiments of the present disclosure, a process of detecting the coordinate information or the moving track by the second processor is like a process of detecting the coordinate information or the moving track by the first processor and is not repeated herein.

In the display control method provided by the embodiments of the present disclosure, when the moving track of the coordinate information mapped to the display area by the external control device of the electronic device is switched between the first display area and the second display area, the first processor and the second processor can timely notify the second processor or the first processor of change information of the moving track, so that the second processor can timely receive data inputted by the external control device, thereby providing a guarantee for the second display area and the first display area to respond to a control operation of the external control device in real time, and further improving a flexibility of human-computer interaction in different display areas in the electronic device.

In one embodiment of the present disclosure, the electronic device further includes a data interface.

In one embodiment, the data interface may be a data receiving end and/or a data sending end of a standard communication bus.

In one embodiment, the data interface may be a parallel interface or a serial interface.

In the embodiments of the present disclosure, the first data includes data sent by the first device to the electronic device via a first communication connection. The first communication connection is established between the first device and the electronic device.

In one embodiment, the first device may be a same type of device as the electronic device.

In one embodiment, the first device may be a device of a different type from the electronic device. For example, the first device is a smart phone, and the electronic device may be a notebook computer.

In one embodiment, the first communication connection may be a wireless connection or a wired connection.

In one embodiment, when the first communication connection is a wireless connection, a RTOS of the electronic device can receive the first data from the first communication connection based on a standard communication protocol.

In one embodiment, when the first communication connection is a wired connection, the RTOS of the electronic device can receive the first data based on a set time sequence via the first communication connection.

Accordingly, an operation of obtaining the first data by the first processor can be implemented in a following way: obtaining by the first processor the first data via the data interface.

In one embodiment, the first data may be data currently displayed on a display screen of the first device.

In one embodiment, the first data may be data that is not currently displayed by the first device but is expected to be displayed in the electronic device.

As can be seen from the above, in the display control method provided by the embodiments of the present disclosure, the first processor and the second processor can not only use different processors to display data thereof in the first display area and the second display area respectively, but the first processor can also receive first data sent by other electronic devices, and when the first data is received, the display controller can divide the display area into a first display area and a second display area and display the first data sent by other electronic devices in the first display area.

Therefore, the display control method provided by the embodiments of the present disclosure can not only display data sent by the electronic device via other processors, but also display first data sent by other electronic devices in different display areas via different processors, thereby further improving a flexibility of the display method and meeting needs of a variety of data display.

In the embodiments of the present disclosure, the first information includes display direction information of the first data in the first device.

In one embodiment, the display direction information may include an actual display direction of the first data on a display screen of the first device.

In one embodiment, the display direction information may include data display direction information set in the first device.

In one embodiment, the display direction information may also include the first data display direction expected by the first device.

In the embodiments of the present disclosure, in response to the first information, the dividing by the display controller the display area of the display device into the first display area and the second display area can be implemented via step E.

E: dividing by the display controller the display area into the first display area and the second display area in response to the first information when the display direction information indicates that the first data is in a vertical display state.

In the embodiments of the present disclosure, when the display direction information indicates that the first data is in the vertical display state, the display controller can divide the display area of the electronic device into the first display area and the second display area based on the first information. In other words, in the embodiments of the present disclosure, a display of data sent by the first device by the electronic device can be flexibly adjusted according to a display mode of the first data in the first device, and the first data of the first device can be independently displayed by an independent processor.

Figure 4:
FIG. 4 illustrates an effect diagram of a notebook computer displaying a smart phone interface when a smart phone is in a vertical screen display state.

FIG. 4 illustrates an effect diagram of a notebook computer displaying a smart phone interface when a smart phone is in a vertical screen display state.

In FIG. 4, a wireless communication connection is established between the computer device 1 and a smart phone 401. Data currently displayed by the smart phone 401, such as desktop window data, is displayed in a specified window 402 on a display screen of the computer device 1. In FIG. 4, the specified window 402 is created by the computer device 1 and implemented by a CPU of the computer device 1 to control an application program in the computer device 1.

All the above implementation embodiments require a support of a smart phone software development kit. Therefore, a limitation of the above solution is that the solution can only realize data transmissions and display operations between specified types of operating systems.

Figure 5:
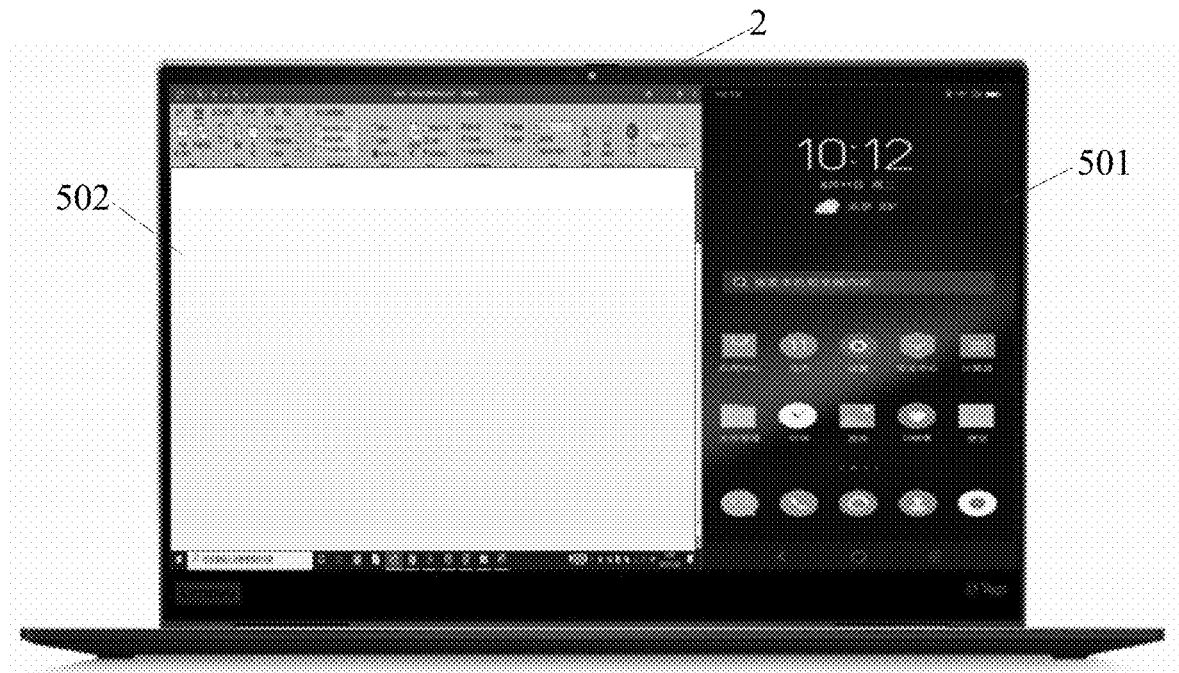
FIG. 5 illustrates an effect diagram of a first type of electronic device displaying first data sent by a first device consistent with various embodiments of the present disclosure.

FIG. 5 illustrates an effect diagram of a first type of electronic device displaying first data sent by a first device consistent with various embodiments of the present disclosure.

In FIG. 5, a first display area 501 and a second display area 502 are managed by a first processor and a second processor respectively. When the first data sent by the first device is displayed in the first display area 501, the second processor may perform a corresponding scaling processing on the second data via the display controller according to a size of the second display area and display the second data in the second display area 502.

As can be seen from the above, in the embodiments of the present disclosure, after the electronic device receives the first data transmitted by the first device, the electronic device does not create a window based on any application and displays data that the first device needs to display in the window. Instead, the first processor determines the first information based on the first data and sends the first information to the display controller. The display controller can divide the display area according to the first information to obtain a first display area and a second display area and display the first data in the first display area and display the second data in the second display area. The display control method provided in the embodiments of the present disclosure can separately manage data to be displayed from different sources via different processors, which further improves a flexibility of data display.

The display control method provided in the embodiments of the present disclosure may further include step F.

F: displaying by the display controller the first data in a full-screen tile in the display area in response to the first information when the display direction information indicates that the first data is in a horizontal display state.

In one embodiment, the first data may be data currently displayed on a horizontal screen in a display interface of the first device.

In one embodiment, displaying the first data in a full-screen tile in the display area may be implemented by scaling the first data according to size information of the display area.

Figure 6:
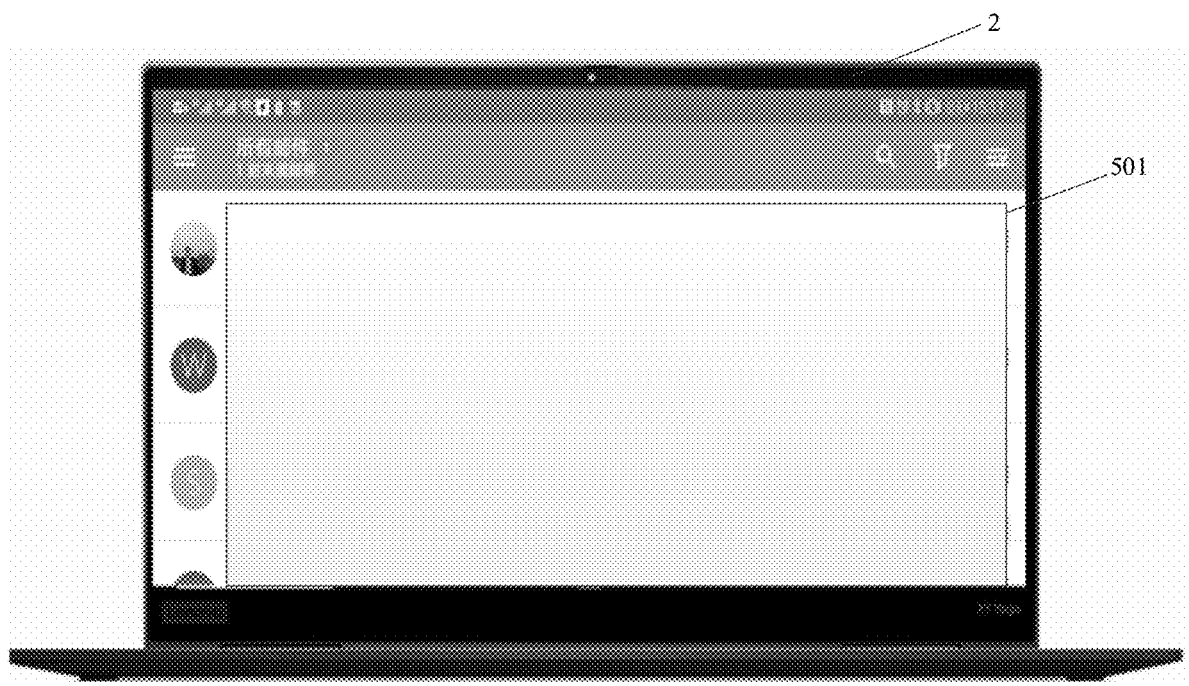
FIG. 6 illustrates an effect diagram of a second type of electronic device displaying first data sent by a first device consistent with various embodiments of the present disclosure.

FIG. 6 illustrates an effect diagram of a second type of electronic device displaying first data sent by a first device consistent with various embodiments of the present disclosure.

In FIG. 6, the first communication connection can be a wired connection or a wireless connection. When the first device is displayed on a horizontal screen and the first data is a mail window, the first data, that is, the mail window can be displayed tiled in the display area of the electronic device 2. The first processor or the display controller may zoom the first data so that the first data can fill the entire display area.

In one embodiment, when the first data is displayed tiled in the display area, the display controller can detect invalid display areas in the display area in real time. Exemplarily, the invalid display areas may be rectangular areas in an upper part and a lower part of the display area. When the first data is not displayed, the invalid display areas can be in a black display state.

In one embodiment, the display controller can also adjust the display state of the first data in real time according to the invalid display areas until the first data can be displayed in full screen in the display area.

In the art, when a window displayed on a horizontal screen of a smartphone is displayed on a display screen of a notebook computer via a way shown in FIG. 4, a large area of invalid display areas may appear in upper and lower display areas of a display screen of the notebook computer, which on the one hand leads to a waste of the display area, and on the other hand, also affects a display effect.

In the display control method provided by the embodiments of the present disclosure, the first processor can flexibly adjust the first data according to an actual data display state of the display area via the display controller, so that the first data can cover the display area, thereby improving a display effect of the first data.

In the embodiments of the present disclosure, the electronic device further includes a memory storing on-screen keyboard (OSK) display data.

In one embodiment, the memory may be a hard disk drive (HDD) of an electronic device or may be a buffer memory.

In one embodiment, the OSK display data may be image data of the keyboard loaded and displayed via software.

In one embodiment, the OSK display data may also include a picture of changes in a corresponding key or key combination in response to any one key or any key combination being pressed. Exemplarily, after responding to any key or key combination being pressed, a picture corresponding to the key or key combination can be switched from a first picture to a second picture. Exemplarily, the first picture and the second picture may be different in any of brightness, stereoscopic visual effect, size, etc.

In the embodiments of the present disclosure, when the OSK display data is stored in the memory, a process of obtaining the first data by the first processor may be implemented via step G1 to step G2.

G1: sending by the second processor OSK creation information to the first processor when the second processor detects a specified operation.

In one embodiment, the specified operation may be inputted by an external control device of the electronic device. Exemplarily, the external control device may be a keyboard and/or mouse.

In one embodiment, the specified operation may be an operation of combination keys inputted by an external control device of the electronic device.

In one embodiment, the specified operation may be a specified type of touch operation detected in the display area of the electronic device. Exemplarily, the specified type of touch operation may include: a multi-touch operation in a specified area, a multi-touch operation whose duration exceeds a preset threshold, a specified sliding touch operation in the display area, etc.

In one embodiment, the OSK creation information may include at least one of size information of the OSK, color information of the OSK, and area information for displaying the OSK.

In one embodiment, when the second processor detects the specified operation, it may send the OSK creation information to the first processor in real time.

G2: obtaining by the first processor the OSK display data from the memory in response to the OSK creation information.

In one embodiment, according to OSK attribute information specified in the OSK creation information, the first processor can obtain the OSK display data matching the attribute information from the memory. The attribute information may include size information, color information, and the like of the OSK.

In one embodiment, the first processor can also determine corresponding OSK size information according to area information for displaying the OSK specified in the OSK creation information and obtain matching OSK display data from the display area according to the OSK size information.

In the embodiments of the present disclosure, after obtaining the OSK display data, the first processor can also display the OSK display data in the first display area and display the second data in the second display area. Exemplarily, before the second data is displayed, the second data can be adaptively zoomed according to a size of the second display area, and a zoom result is displayed in the second display area.

Figure 7A:
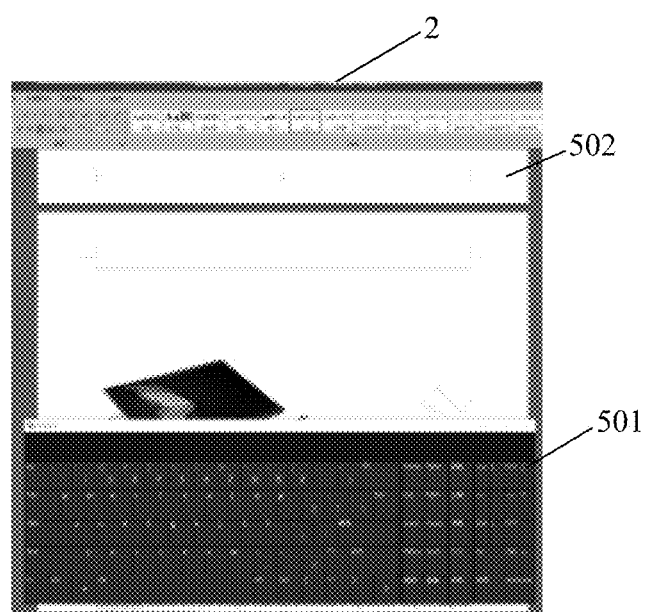
FIG. 7a illustrates an effect diagram of loading on-screen keyboard (OSK) display data in a computer device.

FIG. 7a illustrates an effect diagram of loading OSK display data in a computer device. In FIG. 7a, when the computer device displays the OSK, the OSK may directly cover data currently displayed by the computer device. The above cover effect may directly affect a user's visual effect.

Figure 7B:
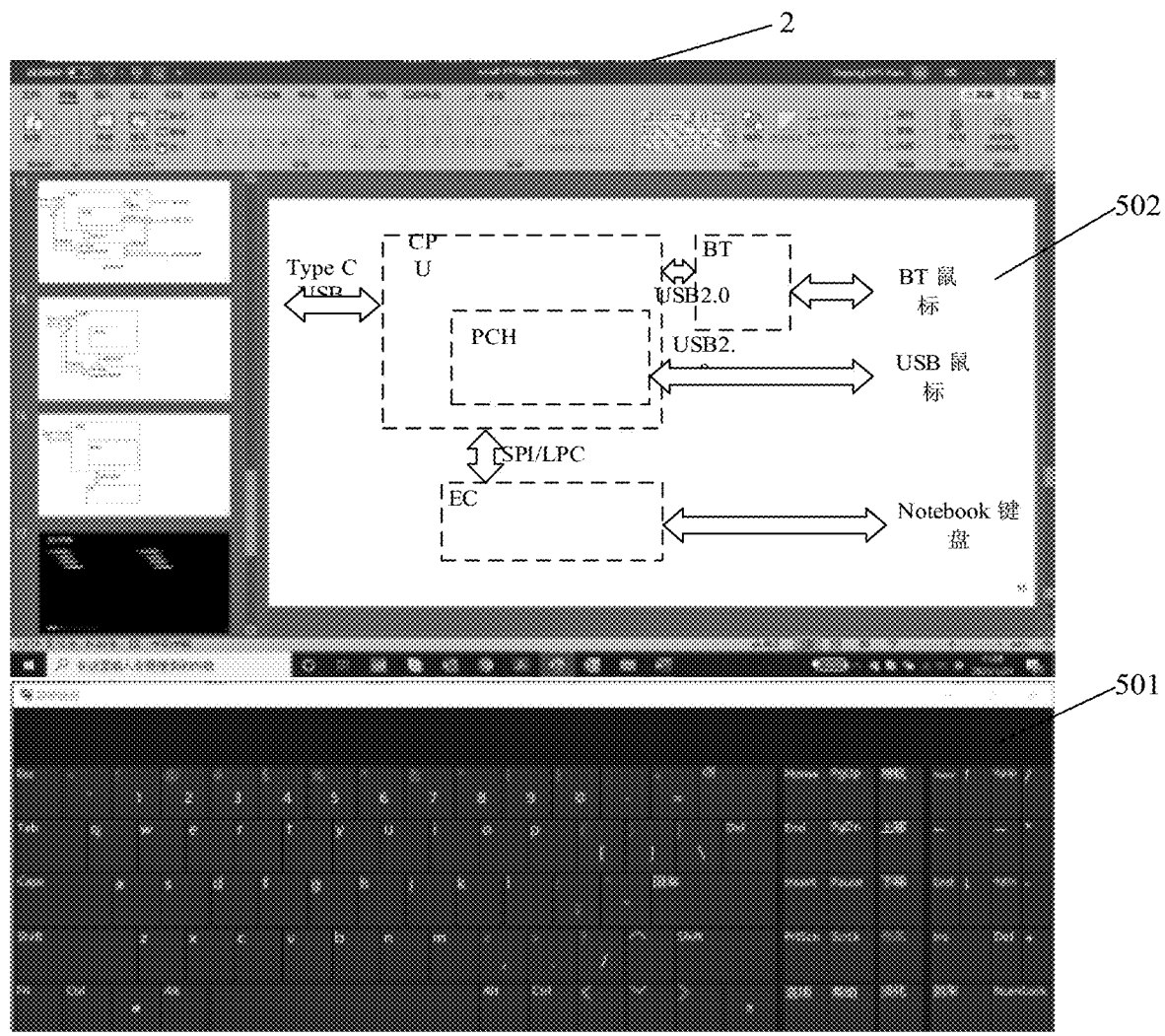
FIG. 7b illustrates an effect diagram of loading a display area of an OSK in an electronic device consistent with various embodiments of the present disclosure.

FIG. 7b illustrates an effect diagram of loading a display area of an OSK in an electronic device consistent with various embodiments of the present disclosure. In FIG. 7b, the OSK display data is completely displayed in the first display area 501 of the electronic device 2, and the second data is displayed in the second display area 502. Since the display area is divided into the first display area and the second display area, a display area of the second data is accordingly reduced. Therefore, currently displayed document data is zoomed in the second display area 502, so that the second data in the second display area 502 can be displayed completely.

As can be seen from the above, compared with a OSK display method in the art, the display control method provided by the embodiments of the present disclosure can not only display the OSK completely, but also improve a display effect of the second data, and further increase a flexibility of the OSK and a second data display.

In the embodiments of the present disclosure, controlling the first data to be displayed in the first display area can also be implemented in following ways: determining by the display controller a first display parameter; and controlling by the display controller the first data to be displayed in the first display area based on the first display parameter.

Accordingly, in the embodiments of the present disclosure, displaying the second data in the second display area may be implemented in following ways: determining by the display controller a second display parameter; and controlling by the display controller the second data to be displayed in the second display area based on the second display parameter.

In one embodiment, the first display parameter and the second display parameter may include at least one of whether to zoom in or out of the first data, display brightness, warm and cool tone, display color, contrast, display size, etc.

In one embodiment, types and numbers of parameters included in the first display parameter and the second display parameter may be different. Accordingly, a display effect of the display controller on the first data in the first display area, and a display effect of the display controller on the second data in the second display area may be different.

In one embodiment, the first display parameter may be determined by the display controller according to the first information.

In one embodiment, the second display parameter may be a display parameter when the first processor obtains the first data.

In one embodiment, the first display parameter and the second display parameter may be separately set by the display controller for the first data and the second data.

As can be seen from the above, in the display control method provided by the embodiments of the present disclosure, not only can the first data and the second data be displayed in different display areas via different processors, but also different display parameters can be set for the first data and the second data via the display controller, thereby further improving a flexibility of data display in different areas.

In the embodiments of the present disclosure, the first display data includes a first resolution. Accordingly, determining by the display controller the first display parameter may be implemented in a following way: determining by the display controller the first resolution based on a type of the first data.

In the embodiments of the present disclosure, the second display data includes a second resolution. Accordingly, determining by the display controller the second display parameters may be implemented in a following way: determining by the display controller the second resolution based on a type of the second data.

In one embodiment, the first resolution and the second resolution may be different.

In one embodiment, when the type of the first data is same as the type of the second data, the first resolution and the second resolution may also be different. Exemplarily, the display controller may determine the first resolution according to size information of the first display area and the type of the first data. The display controller may also determine the second resolution according to size information of the second display area and the type of the second data. For example, the first data and the second data are both text data, but the size information of the first display area is greater than the size information of the second display area. The display controller may set the first resolution to be lower than the second resolution.

In one embodiment, the display controller may also receive the second information sent by the first processor and the second processor in real time and adjust the first resolution and the second resolution according to the second information. Exemplarily, when the first processor and/or the second processor detects that a power consumption of the electronic device is too high or a remaining power is insufficient, the display controller may be controlled to appropriately reduce the first resolution and/or the second resolution. Accordingly, a display brightness of the first display area and/or the second display area can also be appropriately reduced.

In one embodiment, the second information sent by the first processor and/or the second processor to the display controller may be transmitted via a general-purpose input/output (GPIO) interface.

In one embodiment, when data carried by the second information is relatively simple, the second information can be transmitted via a few GPIOs. Accordingly, when a data structure carried in the second information is more complicated, the second information can be transmitted via a parallel data bus.

Figure 8:
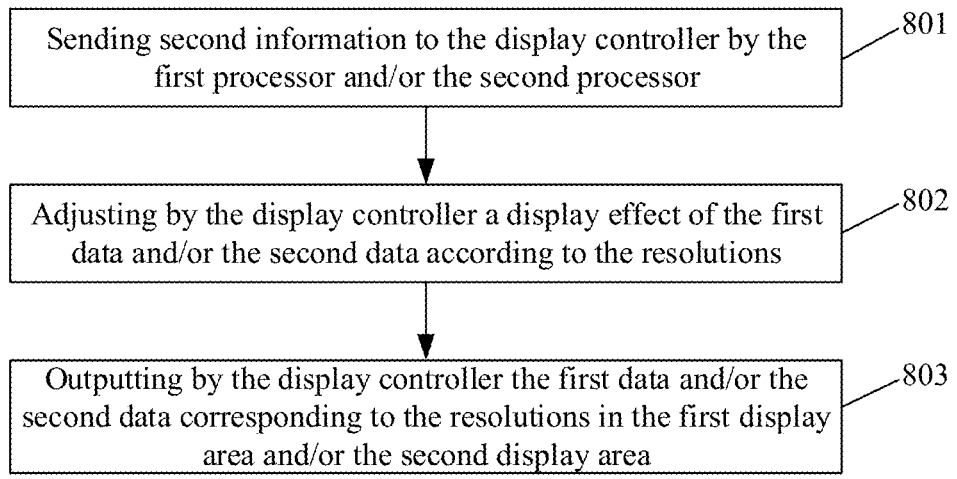
FIG. 8 illustrates a flow chart of a display controller adjusting resolutions according to a data type consistent with various embodiments of the present disclosure.

FIG. 8 illustrates a flow chart of a display controller adjusting resolutions according to a data type consistent with various embodiments of the present disclosure. As shown in FIG. 8, the process can include steps S801-S804.

S801: sending second information to the display controller by the first processor and/or the second processor.

In one embodiment, the second information may not only include the resolutions, but also may include scaling parameters for the first data and/or the second data.

In one embodiment, the second information may also include strategy parameters of how to adjust the first data and/or the second data according to an actual display effect of the first data and/or the second data.

In one embodiment, the second information may include type information of the first data and/or the second data, task type information corresponding to the first data and/or the second data, and the like. Exemplarily, the type information of the first data and/or the second data may include types of pictures, videos, documents, etc. The task type information may include resource type information on which a current task needs to be processed.

S802: adjusting by the display controller a display effect of the first data and/or the second data according to the resolutions.

In one embodiment, a storage space of the display controller may store correspondences between a plurality of data types and a plurality of resolutions. Therefore, the display controller can quickly determine a corresponding target resolution according to a data type.

In one embodiment, a display effect of the display controller on the first data and a display effect of the display controller on the second data may be adjusted separately.

S803: outputting by the display controller the first data and/or the second data corresponding to the resolutions in the first display area and/or the second display area.

In one embodiment, the display controller may also determine whether the resolutions of the first data and/or the second data need to be adjusted. Accordingly, when the resolutions of the first data and/or a resolution of the second data do not need to be adjusted, the display controller can keep the resolutions of the first data and/or the resolution of the second data unchanged.

In the art, best resolutions for different types of data display may be different. For example, when video data is played, it is usually desirable to have a higher resolution of the video data. However, if a user adjusts the resolution to a higher level, a display of all data in the electronic device has a higher resolution effect. When text data is displayed at a higher resolution, the text data may be directly caused to be too small. If the user manually adjusts the resolution of the text data to a lower level, a resolution of the video data will be affected.

In the embodiments of the present disclosure, according to types of the first data and/or the second data, the display controller can determine resolutions matching the types, load and render the first data and/or the second data, thereby realizing an independent adjustment of display parameters such as the resolutions of the first data in the first display area and the second data in the second display area, reducing an impact of resolution adjustment of an electronic device system on resolutions of different data, and improving an effect of data display.

The display control method provided by the embodiment of the present disclosure may further include step K1 to step K2.

K1: sending fourth information to the second processor for the second processor to disconnect a second communication connection between the second device and the second processor when the first processor detects target data.

The target data includes a specified data inputted by the second device.

In one embodiment, the first processor can coordinate and manage input and output interfaces of the electronic device. Therefore, any operation or information sent by an external device or external system to the electronic device may first be intercepted by the first processor.

In one embodiment, when the first processor does not detect the target data, after detecting data inputted by the second device, according to the coordinate information, the first processor may determine whether to send the received data to the second processor. Exemplarily, if the coordinate information is in the first display area, the first processor does not need to forward the data to the second processor. Otherwise, the data may be forwarded to the second processor.

In one embodiment, the first processor can coordinate and manage the input and output interfaces of the electronic device. However, any operation or information sent by the external device or external device of the electronic device to the electronic device can be received by the first processor and the second processor at a same time.

In one embodiment, the second device may be a device of a same type as the electronic device. For example, the second device and the electronic device may be both computer devices.

In one embodiment, the second device may be an external control device of the electronic device. For example, the external control device may include at least one external control device and the second device may be a NoteBook keyboard.

In one embodiment, the second communication connection may be a wired connection or a wireless connection. Exemplarily, the second communication connection may be a USB connection, or may be a WIFI or Bluetooth (BT) connection.

In one embodiment, the target data may be characters or numbers inputted by the second device. The target data may also include data generated due to certain operations performed by the second device.

In one embodiment, the target data may be data generated by a hotkey combination and/or a mouse movement.

In one embodiment, the fourth information may be interrupt request information, and a priority of the interrupt request information may be high.

K2: receiving fifth data sent by the second device and sending the fifth data to a third device by the first processor.

A third communication connection is established between the third device and the electronic device.

In one embodiment, the third communication connection may be a wired connection or a wireless connection.

In one embodiment, after receiving the fifth data, the first processor may directly send the fifth data to the third communication connection.

In one embodiment, the first processor may activate a keyboard video mouse (KVM) sharing function to share the second device with the third device.

Figure 9:
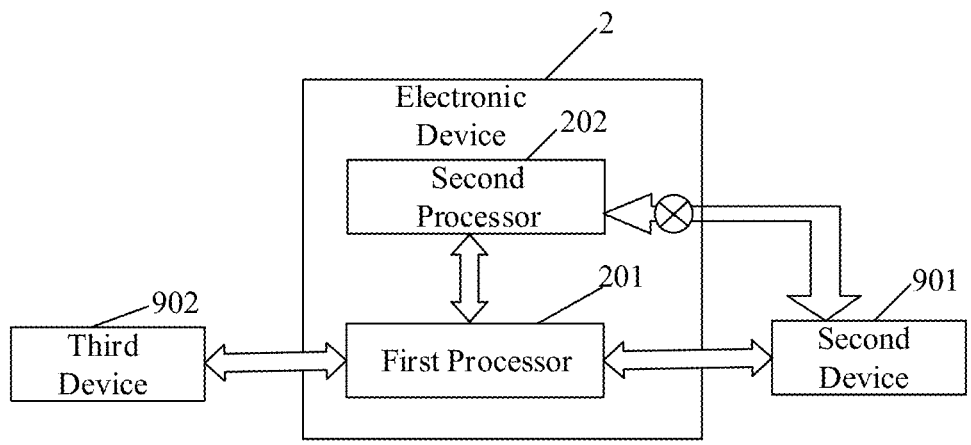
FIG. 9 illustrates a schematic diagram of a first processor forwarding data inputted by a second device to a third device consistent with various embodiments of the present disclosure.

FIG. 9 illustrates a schematic diagram of a first processor forwarding data inputted by a second device to a third device consistent with various embodiments of the present disclosure.

As shown in FIG. 9, when detects the target data sent by a second device 901, according to the target data, the first processor 201 of the electronic device 2 can generate fourth information and send the fourth information to the second processor 202 to disconnect a connection between the second processor 202 and the second device. The first processor can receive the fifth data sent by the second device 901, and directly send the fifth data to the third device 902.

Via the above method, the electronic device can flexibly share the external device thereof to the third device. In the art, only after a specified application program is installed in the electronic device, the external device of the electronic device can be shared to the third device via the specified application program. Compared with the above solution in the art, the device sharing method provided in the embodiments of the present disclosure has lower requirements on a software environment of the electronic device and is more flexible.

Based on the above embodiments, one embodiment of the present disclosure also provides an electronic device 2. As shown in FIG. 2, the electronic device 2 includes a first processor 201, a second processor 202, a display controller 203, and a display device 204.

The first processor 201 is configured to obtain first data, and when the first data is obtained, determine first information based on the first data, and send the first information to the display controller 203.

The display controller 203 is configured to divide a display area of the display device into a first display area and a second display area in response to the first information.

The display controller 203 is further configured to receive the first data sent by the first processor 201 and control the first data to be displayed in the first display area.

The display controller 203 is also configured to obtain second data sent by the second processor 202 and control the second data to be displayed in the second display area. The second data is data displayed in the display area when the electronic device receives the first data.

In some embodiments, the electronic device further includes an input device.

When coordinate information is in the first display area, the first processor 201 is configured to receive third data inputted by the input device. The coordinate information includes position information of the input device mapped in the display area.

When the coordinate information is in the second display area, the second processor 202 is configured to receive fourth data inputted by the input device.

In some embodiments, the input device is an external control device.

The first processor 201 and/or the second processor 202 are configured to analyze a moving track of the coordinate information.

When a first condition is met, the first processor 201 is configured to send second information to the second processor 202. The first condition indicates that the moving track is in the first display area and moves to the second display area. The second information includes an input operation of the external control device that the second processor 202 needs to receive.

Or when a second condition is met, the second processor 202 is configured to send third information to the first processor. The second condition indicates that the coordinate information is in the second display area and move to the first display area. The third information includes the first processor 201 needs to receive the input operation from the external control device.

In some embodiments, the electronic device further includes a data interface. The first data includes data sent by a first device to the electronic device 2 via a first communication connection. The first communication connection is established between the first device and the electronic device 2.

The first processor 201 obtains the first data via the data interface.

In some embodiments, the first information includes display direction information of the first data in the first device.

When the display direction information indicates that the first data is in a vertical display state, in response to the first information, the display controller 203 is configured to divide the display area into a first display area and a second display area When the display direction information indicates that the first data is in a horizontal display state, in response to the first information, the display controller 203 is further configured to display the first data in a full-screen tile in the display area.

The electronic device 2 also includes a memory storing OSK display data.

The second processor 202 is configured to send OSK creation information to the first processor 201 when a specified operation is detected.

The first processor 201 is configured to respond to the OSK creation information and obtain the OSK display data from the memory.

In some embodiments, the display controller 203 is configured to determine a first display parameter.

The display controller 203 is further configured to control the first data to be displayed in the first display area based on the first display parameter.

The display controller 203 is further configured to determine a second display parameter, and based on the second display parameter, control the second data to be displayed in the second display area.

In some embodiments, the first display parameter includes a first resolution.

The display controller 203 is configured to determine the first resolution based on a type of the first data.

Accordingly, the second display parameter includes a second resolution.

The display controller 203 is further configured to determine the second resolution based on a type of the second data.

In some embodiments, when target data is detected, the first processor 201 is configured to send fourth information to the second processor 202, so that the second processor 202 can disconnect a second communication connection between the second device and the second processor 202. The target data includes a specified data inputted by the second device.

The first processor 201 is configured to receive fifth data sent by the second device and send the fifth data to the third device. A third communication connection is established between the third device and the electronic device.

As can be seen from the above, the first processor 201 of the electronic device 2 provided by the embodiments of the present disclosure can determine the first information based on the first data when the first data is obtained, so that the display controller 203 of the electronic device 2 can divide the display area into the first display area and the second display area. The display area of the electronic device 2 is uniformly managed by the display controller 203, thereby improving an efficiency of the display area control. The display controller 203 can also receive the first data sent by the first processor 201 and control the first data to be displayed in the first display area. At a same time, the display controller 203 can receive the second data sent by the second processor 202 and control the second data to be displayed in the second display area. Therefore, the display controller of the electronic device 2 can receive control signals of at least two processors, and under a control of the at least two controllers, respectively display the first data and the second data that the first processor and the second processor need to display in different display areas.

Based on the above embodiments, the embodiments of the present disclosure also provide a computer-readable storage medium storing a computer program. When the computer program is executed by a processor, the display control method described in any of the above embodiments can be implemented.

The above description of the various embodiments tends to emphasize the differences between the various embodiments, the same or similarities can be referred to each other, which will be not repeated herein.

The above description of the various embodiments tends to emphasize differences between the various embodiments. Commons or similarities of the various embodiments can be referred to each other. For a sake of brevity, details are not repeated herein.

Methods disclosed in the embodiments provided in the present disclosure may be combined arbitrarily without conflict to obtain new method embodiments.

Features disclosed in the product embodiments provided in the present disclosure can be combined arbitrarily without conflict to obtain new product embodiments.

The methods provided by the present disclosure and the features disclosed in the device embodiments can be combined arbitrarily without conflict to obtain new method embodiments or new device embodiments.

The above computer-readable storage medium may be a read-only memory (Read Only Memory, ROM), a programmable read-only memory (PROM), and an erasable programmable read-only memory (EPROM), an electrically erasable programmable read-only memory (EEPROM), a ferromagnetic random-access memory (FRAM), a flash memory, a magnetic surface memory, an optical disc, a compact disc read-only memory (CD-ROM) or other storage medium. The above computer-readable storage medium may include one of the above memories or any combination of various electronic devices, such as mobile phone, computer, tablet device, personal digital assistant, etc.

In the present specification, terms "include", "comprise" or any other variants thereof are intended to cover non-exclusive inclusion, so that a process, method, article or device including a series of elements includes not only the series of elements, but also other elements that are not explicitly listed, or include elements inherent to the process, method, article, or device. Without more restrictions, elements defined by the sentence "including a . . . " do not exclude existences of other identical elements in a process, method, article, or device that includes the elements.

Serial numbers of the above embodiments of the present disclosure are only for description, and do not represent a superiority or inferiority of the embodiments.

Via a description of the above embodiments, those skilled in the art may understand that the methods of the above embodiments can be implemented by means of software and necessary general hardware nodes. The methods can also be implemented by means of hardware. In many cases the former means is a better implementation way. Therefore, technical solutions of the present disclosure essentially or part of the technical solutions of the present disclosure that contributes to an existing technology can be embodied in a form of a software product. The computer software product is stored in a storage medium such as ROM/RAM, magnetic disk, or CD. The computer software product includes several instructions to make a terminal device such as a mobile phone, computer, server, air conditioner, or network device or the like execute a method described in each embodiment of the present disclosure.

The present disclosure is described with reference to flowcharts and/or block diagrams of methods, devices (systems), and computer program products of the embodiments of the present disclosure. Each process and/or block in a flowchart and/or block diagram, and a combination of processes and/or blocks in the flowchart and/or block diagram can be implemented by computer program instructions. The computer program instructions can be provided to a processor of a general-purpose computer, a special-purpose computer, an embedded processor, or other programmable data processing device to produce a machine, so that the instructions executed by the processor of the computer or other programmable data processing device can be configured to generate a device for realizing functions specified in one process or a plurality of processes in the flowchart and/or one block or a plurality of blocks in the block diagram.

The computer program instructions may also be stored in a computer-readable memory that can direct a computer or other programmable data processing device to function in a particular manner, so that the instructions stored in the computer-readable memory produce an article of manufacture including an instruction device which implements functions specified in one process or a plurality of processes in a flowchart and/or one block or a plurality of blocks in a block diagram.

The computer program instructions can also be loaded onto a computer or other programmable data processing device, so that a series of operation steps are executed on the computer or the other programmable device to produce a computer-implemented processing. The instructions executed on the computer, or the other programmable device provide steps for implementing functions specified in one process or a plurality of processes in the flowchart and/or one block or a plurality of blocks in the block diagram.

The above embodiments are only preferred embodiments of the present disclosure and are not intended to limit the scope of the present disclosure. Any equivalent structure or equivalent process transformation made by using the content of the description and drawings of the present disclosure, or directly or indirectly used in other related technical fields, shall be included in the patent protection scope of the present disclosure.

What is claimed is:

1. A display control method, applied to an electronic device including a first processor, a second processor, a display controller, a display device, comprising:
   determining first information based on first data, and sending the first information to the display controller, the first data being data from an external electronic device;
   dividing by the display controller a display area of the display device into a first display area and a second display area in response to the first information;
   receiving the first data sent by the first processor, and controlling the first data to be displayed in the first display area by the display controller; and
   obtaining second data sent by the second processor and controlling the second data to be displayed in the second display area by the display controller, wherein the second data is data displayed in the display area when the electronic device receives the first data;
   wherein the first information includes display direction information of the first data at the external electronic device, and dividing the display area of the display device into the first display area and the second display area in response to the first information includes:
      in response to the external electronic device displaying the first data on a vertical screen, dividing by the display controller the display area into the first display area and the second display area, and controlling the first data to be displayed in the first display area.

2. The method according to claim 1, wherein:
   the electronic device further includes an input device;
   when coordinate information is in the first display area, the first processor receives third data inputted by the input device, wherein the coordinate information includes position information of the input device mapped in the display area; and
   when the coordinate information is in the second display area, the second processor receives fourth data inputted by the input device.

3. The method according to claim 2, wherein the input device is an external control device, and the method further includes:
   analyzing a moving track of the coordinate information; and
   sending by the first processor second information to the second processor when a first condition is met, wherein the first condition includes that the moving track is in the first display area and moving to the second display area, and the second information includes an input operation of the external control device that the second processor needs to receive; or
   sending by the second processor third information to the first processor when a second condition is met, wherein the second condition includes that the coordinate information is in the second display area and moving to the first display area, and the third information includes an input operation of the external control device that the first processor needs to receive.

4. The method according to claim 1, wherein:
the electronic device further includes a data interface;
the first data includes data sent by a first device to the electronic device via a first communication connection;
the first communication connection is established between the first device and the electronic device; and
the obtaining of the first data by the first processor includes obtaining the first data via the data interface by the first processor.

5. The method according to claim 1, wherein:
the electronic device also includes a memory;
the memory stores on-screen keyboard (OSK) display data; and
the obtaining of the first data by the first processor includes:
sending OSK creation information to the first processor when the second processor detects a specified operation; and
obtaining the OSK display data from the memory by the first processor in response to the OSK creation information.

6. The method according to claim 1, wherein:
the controlling of the first data to be displayed in the first display area includes:
determining a first display parameter by the display controller; and
controlling the first data to be displayed in the first display area by the display controller based on the first display parameter; and
the displaying of the second data in the second display area includes:
determining a second display parameter by the display controller; and
controlling the second data to be displayed in the second display area by the display controller based on the second display parameter.

7. The method according to claim 6, wherein:
the first display parameter includes a first resolution, the determining of the first display parameter by the display controller includes:
determining the first resolution by the display controller based on a type of the first data; and
the second display parameter includes a second resolution, the determining of the second display parameter by the display controller includes:
determining the second resolution by the display controller based on a type of the second data.

8. The method according to claim 1, further comprising:
sending fourth information to the second processor for the second processor to disconnect a second communication connection between a second device and the second processor when the first processor detects target data, wherein the target data includes specified data inputted by the second device; and
receiving fifth data sent by the second device and sending the fifth data to a third device by the first processor, wherein a third communication connection is established between the third device and the electronic device.

9. The method according to claim 1,
wherein the electronic device further includes an input device,
the method further comprising:
in response to coordinate information being in the first display area, receiving, by the first processor, third data inputted by the input device, and sending, by the first processor, the third data to the display controller for the display controller to control the third data to be displayed in the first display area, wherein the coordinate information includes position information of the input device mapped in the display area; and
in response to the coordinate information being in the second display area, receiving, by the second processor, fourth data inputted by the input device, and sending, by the second processor, the fourth data to the display controller for the display controller to control the fourth data to be displayed in the second display area.

10. The method according to claim 1, wherein:
the first processor is different from the second processor, the first processor includes an artificial intelligence chip (AI chip), and the second processor includes a central processing unit (CPU);
the first processor is configured to zoom the first data to be displayed in the first display area; and
before the second data is displayed, the second processor is configured to zoom the second data according to a size of the second display area, and the second data is displayed in the second display area after being zoomed.

11. The method according to claim 1, wherein:
the first data further includes on-screen keyboard (OSK) display data; and
before the second data is displayed, the second data is adaptively zoomed by the second processor according to a size of the second display area, and the second data is displayed in the second display area after being zoomed.

12. The method according to claim 1, further comprising:
in response to the external electronic device displaying the first data on a horizontal screen, controlling by the display controller the first data to be displayed and filled the entire display area.

13. An electronic device, comprising:
a first processor, a second processor, a display controller, and a display device, wherein:
the first processor is configured to obtain first data, and when the first data is obtained, the first processor is configured to determine first information based on the first data, and send the first information to the display controller, the first data being data from an external electronic device;
the display controller is configured to divide a display area of the display device into a first display area and a second display area in response to the first information;
the display controller is further configured to receive the first data sent by the first processor, and control the first data to be displayed in the first display area;
the display controller is further configured to obtain second data sent by the second processor and control the second data to be displayed in the second display area, the second data is data displayed in the display area when the electronic device receives the first data; and
the first information includes display direction information of the first data at the external electronic device, and the display controller is further configured to, in response to the external electronic device displaying the first data on a vertical screen, dividing by the display controller the display area into the first display area and the second display area, and controlling the first data to be displayed in the first display area.

14. The device according to claim 13, further including an input device, wherein:
when coordinate information is in the first display area, the first processor is configured to receive third data inputted by the input device, wherein the coordinate information includes position information of the input device mapped in the display area; and
when the coordinate information is in the second display area, the second processor is configured to receive fourth data inputted by the input device.

15. The device according to claim 14, wherein:
the input device is an external control device, and a moving track of the coordinate information is analyzed;
the first processor is configured to send second information to the second processor when a first condition is met, wherein the first condition includes that the moving track is in the first display area and moving to the second display area, and the second information includes an input operation of the external control device that the second processor needs to receive; or
the second processor is configured to send third information to the first processor when a second condition is met, wherein the second condition includes that the coordinate information is in the second display area and moving to the first display area, and the third information includes an input operation of the external control device that the first processor needs to receive.

16. The device according to claim 13, further including a data interface, wherein
the first data includes data sent by a first device to the electronic device via a first communication connection;
the first communication connection is established between the first device and the electronic device; and
the first processor obtains the first data by obtaining the first data via the data interface.

17. The device according to claim 13, further including a memory, wherein
the memory stores on-screen keyboard (OSK) display data; and
the first processor is configured to obtain the first data by performing:
sending OSK creation information to the first processor when the second processor detects a specified operation; and
obtaining the OSK display data from the memory by the first processor in response to the OSK creation information.

18. The device according to claim 13, wherein:
the display controller is configured to control the first data to be displayed in the first display area by performing:
determining a first display parameter by the display controller; and
controlling the first data to be displayed in the first display area by the display controller based on the first display parameter; and
the displaying of the second data in the second display area includes:
determining a second display parameter by the display controller; and
controlling the second data to be displayed in the second display area by the display controller based on the second display parameter.

19. The device according to claim 18, wherein:
the first display parameter includes a first resolution, and the display controller is configured to determine the first display parameter by performing:
determining the first resolution by the display controller based on a type of the first data; and
the second display parameter includes a second resolution, and the display controller is configured to determine the second display parameter by performing:
determining the second resolution by the display controller based on a type of the second data.

20. The device according to claim 13, further comprising:
the first processor is configured to send fourth information to the second processor for the second processor to disconnect a second communication connection between a second device and the second processor when the first processor detects target data, wherein the target data includes specified data inputted by the second device; and
the first processor is configured to receive fifth data sent by the second device and send the fifth data to a third device, wherein a third communication connection is established between the third device and the electronic device.

* * * * *